United States Patent
Ericson et al.

(10) Patent No.: US 12,277,677 B2
(45) Date of Patent: Apr. 15, 2025

(54) METHOD FOR CONTROLLING A BITRATE OF A VIDEO STREAM CAPTURED WITH AN IMAGE AQUISITION DEVICE

(71) Applicant: Axis AB, Lund (SE)

(72) Inventors: Joakim Ericson, Lund (SE); Song Yuan, Lund (SE)

(73) Assignee: AXIS AB, Lund (SE)

( * ) Notice: Subject to any disclaimer, the term of this patent is extended or adjusted under 35 U.S.C. 154(b) by 231 days.

(21) Appl. No.: 17/993,243

(22) Filed: Nov. 23, 2022

(65) Prior Publication Data

US 2023/0177661 A1 Jun. 8, 2023

(30) Foreign Application Priority Data

Dec. 3, 2021 (EP) .................................. 21212337

(51) Int. Cl.
| | | |
|---|---|---|
| *G06T 5/20* | (2006.01) | |
| *G06T 5/70* | (2024.01) | |
| *G06T 5/73* | (2024.01) | |
| *H04N 23/80* | (2023.01) | |

(52) U.S. Cl.
CPC ................. *G06T 5/20* (2013.01); *G06T 5/70* (2024.01); *G06T 5/73* (2024.01); *H04N 23/80* (2023.01); *G06T 2207/10016* (2013.01); *G06T 2207/20004* (2013.01); *G06T 2207/30232* (2013.01)

(58) Field of Classification Search
CPC . G06T 2207/10016; G06T 2207/20004; G06T 2207/30232; G06T 5/20; G06T 5/70; G06T 5/73; G08B 13/19667; G08B 13/19686; H04N 19/117; H04N 19/146; H04N 19/17; H04N 21/4318; H04N 23/80; H04N 7/18
See application file for complete search history.

(56) References Cited

U.S. PATENT DOCUMENTS

| | | | |
|---|---|---|---|
| 7,620,261 B2 * | 11/2009 | Chiang | H04N 19/117 |
| | | | 382/232 |
| 8,867,853 B2 | 10/2014 | Migdal et al. | |
| 10,277,901 B2 * | 4/2019 | Danielsson Fan | H04N 19/70 |
| 2002/0186890 A1 * | 12/2002 | Lee | H04N 19/80 |
| | | | 375/E7.193 |
| 2007/0171988 A1 * | 7/2007 | Panda | H04N 19/137 |
| | | | 375/E7.181 |
| 2008/0310516 A1 | 12/2008 | Kobayashi | |
| 2014/0355671 A1 * | 12/2014 | Peng | H04N 19/176 |
| | | | 375/240.03 |
| 2016/0004912 A1 | 1/2016 | Varghese | |
| 2016/0042527 A1 | 2/2016 | Kim et al. | |

(Continued)

FOREIGN PATENT DOCUMENTS

CN 102740052 A 10/2012

OTHER PUBLICATIONS

Extended European Search Report dated May 30, 2022 for European Patent Application No. 21212337.6.

(Continued)

*Primary Examiner* — Jessica M Prince
(74) *Attorney, Agent, or Firm* — Volpe Koenig

(57) ABSTRACT

The present disclosure generally relates to the field of camera surveillance, and in particular to a method and control unit for controlling a bitrate of a video stream captured with an image acquisition device.

20 Claims, 8 Drawing Sheets

(56) References Cited

U.S. PATENT DOCUMENTS

2018/0174414 A1\* 6/2018 Edpalm ................ H04N 19/136
2018/0324436 A1 11/2018 Danielsson Fan
2019/0020810 A1 1/2019 Kim et al.
2023/0108667 A1\* 4/2023 Hassbring .............. H04N 23/71
348/143

OTHER PUBLICATIONS

Erdelyi et al., "Adaptive cartooning for privacy protection in camera networks," 2014 11th IEEE International Conference on Advanced Video and Signal Based Surveillance (AVSS), 2014, pp. 44-49 (2014).

\* cited by examiner

METHOD FOR CONTROLLING A BITRATE OF A VIDEO STREAM CAPTURED WITH AN IMAGE AQUISITION DEVICE

FIELD OF INVENTION

The present disclosure generally relates to the field of camera surveillance, and in particular to a method and control unit for controlling a bitrate of a video stream captured with an image acquisition device.

TECHNICAL BACKGROUND

In various camera surveillance applications, it is sometimes necessary to mask objects in a video stream captured by a camera. Important reasons for object masking are to ensure privacy for people that are present in the video stream and to protect other types of personal information that may be captured in the video stream.

As an example, object detection may be used for detecting people. Masking of the people may be performed by extracting the image coordinates of the relevant parts of an image frame. Once the image coordinates are known, the relevant parts in the video stream can be masked, pixelated, blurred, or in other ways modified to obscure identifiers in the video stream.

One known way to achieve masking is to apply a Sobel filter which results in an anonymized image where only edges or contours are shown. An advantage of using this type of filter is that although the image is anonymized an operator can still resolve the movements and actions of people in the captured scene which is sufficient for most surveillance use cases.

However, compared to for example solid masks and pixilation, the produced data bitrate of the Sobel filtered video stream is higher which may cause network or storage problems, or general information overload for operators.

Accordingly, there is room for improvements with regards to handling the produced data in an anonymized video stream.

SUMMARY

In view of above-mentioned and other drawbacks of the prior art, the present disclosure provides an improved method for controlling a bitrate of a video stream captured with an image acquisition device and filtered using an edge filter that alleviates at least some of the drawbacks of prior art.

According to a first aspect of the present disclosure, it is therefore provided a method for controlling a bitrate of a video stream captured with an image acquisition device and filtered using an edge filter for privacy masking of at least one area of a captured scene in the video stream.

The method comprises determining a present bitrate value of the video stream, and in response to detecting that the present bitrate value exceeds a threshold, adjusting at least one parameter of the edge filter to further reduce the amount of edges in the at least one area of the video stream to thereby control the bitrate.

Adjusting the parameters of an edge filter changes the produced bitrate of the resulting filtered video stream. Accordingly, by monitoring the present bitrate, and with knowledge of the acceptable bitrate, the filter parameters of the edge filter can be adjusted to reduce the amount of edges, which effectively controls the bitrate. The bitrate is reduced as a result of the reduced amount of edges.

Accordingly, using an edge filter advantageously allows for masking areas of the video stream to protect the privacy of people in the video stream while still allowing motions and actions to be detectable, also allows for actively, and in at least near real-time, changing the parameters of the edge filter to thereby provide for controlling the bitrate.

A video stream is generally a set of consecutive image frames captured over time. The consecutive image frames collectively form the video stream.

An edge filter operates by means of an algorithm adapted to find edges in an image frame. The basic operation of such an edge filter is that an algorithm finds edges or curves in an image frame at which image brightness has a fast or sharp change or discontinuity. Once edges or curves are found, they are enhanced whereas other parts appearance are suppressed. The edge filter is applied to each image frame of the video stream.

An edge filter is defined by its parameters that may be part of a filter operator. The filter operator may be of different kinds depending on the specific edge filter being used. However, the filter operator often operates as a gradient operator that computes or estimates intensity gradients between adjacent pixels of an image frame. The adjacent pixels may be direct neighbors, but the filter operators often also include second and/or even further distant neighbors. The computed intensity gradient is compared to a detection threshold for determining whether or not an edge is considered detected.

Accordingly, the edge filter is a filter that enhances edge points and suppresses non-edge points. An edge point corresponds to one or more pixels in the image frame that are determined to belong to an edge at which image brightness has a fast or sharp change or discontinuity. Similarly, a non-edge point corresponds to one or more pixels in the image frame that are determined to not belong to an edge. Thus, by applying the edge filter to the video stream edge points in image frames will be enhanced while non-edge points will be suppressed. For example, the edge filter, sometimes also referred to as an edge detection filter, may be a Sobel filter, a Canny filter, a Difference of Gaussian (DoG) filter, a Laplacian filter, a Prewitt filter, Robert cross filter, or a Scharr filter, just to give some examples. In order to fit the use case, the output of the edge filter, i.e., the edge-filtered version of the video stream, may be modified using one or more operations, such as an absolute-value operation to not differentiate between positive and negative gradients, a gain operator to adjust strength, an offset operator to make edge points black and non-edge points white, and/or a noise reduction operator to remove unnecessary sparse black edge pixels not part of real edges or other structures in the image.

An example edge filter is based on a 3×3 kernel, or operator, such that pixels in a 3×3 sub-matrix are considered when computing the gradient for a given pixel, where the elements of the kernel set the weights for different pixel values used for computing the gradient. Using an operator of this size provides a computationally efficient edge filtering process while providing filtered images of acceptable quality. Larger kernels such as 4×4 or 5×5 are also applicable to embodiments discussed herein.

The bitrate threshold may be set based on knowledge of the bitrate capacity or bandwidth of a network connected to the image acquisition device or a memory capacity, or some other predetermined parameter. The threshold may be set with a margin to not risk exceeding some critical bitrate level.

A bitrate is the number of bits per unit time that is being generated from the image frames of the video stream captured by the image acquisition device. The bits may be generated in an encoder which encodes the captured image frames according to an encoding protocol. The present bitrate value is directly or indirectly indicative of the produced bits per unit time.

Privacy masking is understood as a feature to protect personal privacy by hiding or concealing parts of an image frame with a masked area. Generally, a privacy mask may be static or dynamic, where the one that will be most discussed herein are dynamic masks, in the form of an edge filter applied to image frames, but also in the form of solid masks or blurring. A static mask may be applied globally in the same way across an entire or at least part of an image frame, whereas a dynamic mask may be applied once for example a face or person is detected in the video stream.

The parameters of the edge filter may refer to the elements of the kernels or to the detection threshold that the output of the filter operator is compared to, or a gain operator of the edge filter. Adjusting the parameter of the edge filter to reduce the present bitrate value may be understood as that a sensitivity of the edge filter is adjusted so that fewer edges are enhanced by the filter.

According to an embodiment, the present bitrate value may be a present bitrate or a present rate of a bitrate increase. A present rate of bitrate increase is the rate or pace at which the bitrate is presently increasing. Monitoring and responding to the rate or pace at which the bitrate is presently increasing allows for a faster, or sooner, response to high bitrates since the adjustment in edge filter parameters can be made when a high rate of increase is detected before the absolute bitrate reaches a critically high bitrate. It may further be possible to combine a present bitrate with a rate of bitrate increase for a combined comparison to a respective threshold. For example, if the rate of bitrate increase suddenly increases rapidly, then the filter parameters may be adjusted before the bitrate itself reaches the bitrate threshold.

According to an embodiment, adjusting may further comprise adjusting the at least one parameter of the edge filter until the present bitrate value is below the threshold. Hereby, advantageously, the adjustment of the at least one filter parameter continues until the bitrate is again at an acceptable level.

According to an embodiment, the at least one parameter of the edge filter may be adjusted for predetermined areas of the captured scene. To determine predetermined areas may include detecting areas in the video stream where people are present, by using for example an object detection algorithm or motion detection. The predetermined areas may also be related to areas in the video stream where static masking should be applied. The predetermined areas may be preset based on prior knowledge of the monitored scene. Static masking relates to masking of an area regardless of the presence of moving objects in the area. Thus, with static masking, predefined areas of the video stream are masked.

According to an embodiment, the method may further comprise detecting objects in areas of the captured scene; detecting sizes of the objects in the captured scene; and, adjusting the at least one parameter of the edge filter differently in the areas of the captured scene depending on the size of the detected objects in the respective area. For example, privacy masking is not as critical for people or objects far away from the image acquisition device since their privacy can be ensured by that they are far away from the camera. People or objects far from the image acquisition device appear small in the video stream. This means that the size of objects in the video stream provides an efficient way to determine whether, or to what degree, a specific object should be masked using the edge filter. This advantageously provides for tailoring the edge filter adjustment based on the required privacy masking in different areas of the video stream.

According to an embodiment, the at least one parameter of the edge filter may be adjusted to reduce the amount of edges further for areas of the scene with objects having detected sizes exceeding or being equal to a size threshold, compared to in areas with objects having detected sizes below the size threshold. The size threshold may be set so that areas in the video stream with people at a distance sufficiently far from the image acquisition device to not need excessive privacy masking are filtered to maintain more edges that in areas with people closer to the image acquisition device. Advantageously, the filtering of the areas with objects closer to the camera provides for reducing the bitrate of the video stream more than filtering of areas of objects further away, since objects in the video stream far from the camera generally causes less edges than objects closer to the camera. This type of size thresholding provides a relatively straight-forward yet efficient way to find areas that are in more need of edge filtering than other areas.

According to an embodiment, adjusting may comprise adjusting the parameter of the edge filter globally for static masking areas of the captured scene. Thus, the at least one parameter of the edge filter may be adjusted for all areas that are defined as areas where static masking should be applied.

According to an embodiment, the method may further comprise detecting a number of people in the captured scene, and in response to detecting that the number of people exceeds a threshold, i.e., a people number threshold, adjusting the at least one parameter of the edge filter. More people in the video stream may require adjusted edge filter parameters to reduce the bitrate. For example, if only people are masked using the edge filter and the number of people increases, then the edge filter must be applied on more areas of the video stream which increases the produced bitrate. Advantageously, the edge filter parameters are therefore adjusted to accommodate for this change in number of people and edge filtering need with regards to the produced bitrate, to maintain or reduce the produced bitrate or rate of bitrate increase.

According to an embodiment, the method may further comprise applying image blurring on selected areas of the captured scene to further control the bitrate.

According to an embodiment, the method may comprise applying solid color masking on selected areas of the captured scene to further control the bitrate.

Using for example blurring or solid color masking provides further tools for tailoring the privacy masking depending on a specific implementation at hand.

According to an embodiment, the method may further comprise detecting a moving object, and adjusting the at least one parameter of the edge filter depending on a present size of the moving object in the captured scene. Moving objects such as people cause a relatively high bitrate. Thus, adjusting the edge filter is especially advantageous for areas in the video stream including moving objects.

In some possible implementations, the threshold may be a first threshold, whereby the method may further comprise: in response to detecting that the present bitrate value is below a second threshold lower than the first threshold, adjusting at least one parameter of the edge filter to increase the amount of edges in the at least one area of the video stream to thereby control the bitrate. Using the second lower threshold provides for ensuring that the edge filtering does not cause excessive loss of detail in the filtered video stream.

Accordingly, the second threshold is set so that the edge filtering is adjusted so that motions, events, or actions in the filtered video stream are distinguishable while still ensuring privacy.

According to a second aspect of the present disclosure, there is provided a control unit for controlling a bitrate of a video stream captured with an image acquisition device and filtered using an edge filter for privacy masking of at least one area of a captured scene in the video stream, the control unit is configured to perform the steps of the methods according to the first aspect of the disclosure.

Further embodiments of, and effects obtained through this second aspect of the present disclosure are largely analogous to those described above for the first aspect of the disclosure.

According to a third aspect of the present disclosure, there is provided a system comprising an image acquisition device configured to capture a video stream, and a control unit according to the second aspect.

The image acquisition device is preferably a video camera such as a surveillance camera.

Further embodiments of, and effects obtained through this third aspect of the present disclosure are largely analogous to those described above for the first aspect and the second aspect of the disclosure.

According to a fourth aspect of the present disclosure, there is provided computer program comprising instructions which, when the program is executed by a computer, cause the computer to carry out the steps of the method of any of the herein discussed embodiments.

Further embodiments of, and effects obtained through this fourth aspect of the present disclosure are largely analogous to those described above for the other aspects of the disclosure.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF DRAWINGS

The various aspects of the disclosure, including its particular features and advantages, will be readily understood from the following detailed description and the accompanying drawings, in which.

DETAILED DESCRIPTION

Figure 1:
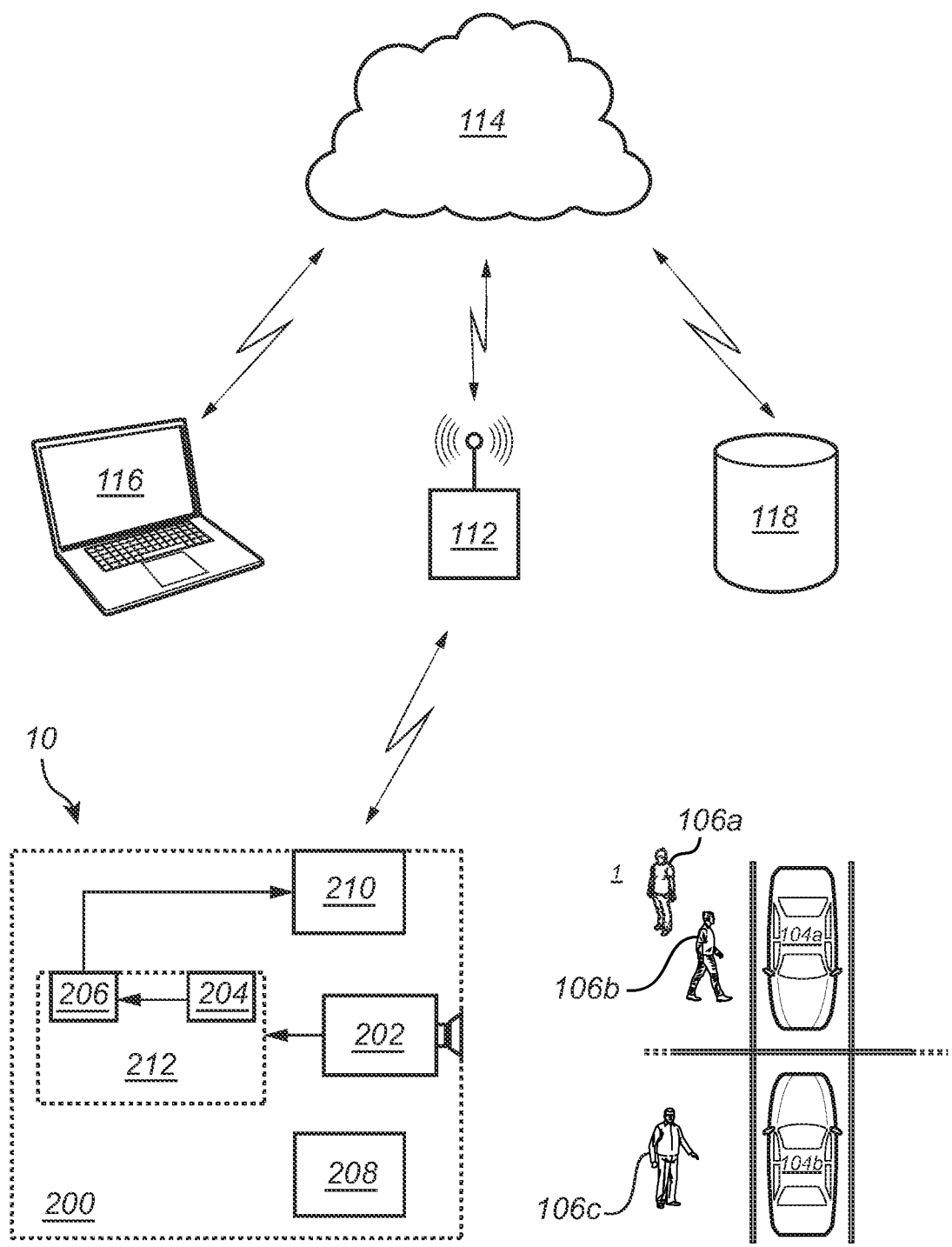
FIG. 1 conceptually illustrates an example application of embodiments of the disclosure.

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled person. Like reference characters refer to like elements throughout.

Turning now to the drawings and to FIG. 1 in particular, there is shown a scene 1 being monitored by an image acquisition device 200, e.g., a camera or more specifically a surveillance camera. In the scene 1, there is a set of objects 104a, 104b, that may be for example vehicles in a parking lot, and a number of people 106a-c.

The camera 200 may be mounted on a building, on a pole, or in any other suitable position depending on the specific application at hand. Further the camera 200 may be a fixed camera or a movable camera such as pan, tilt and zoom, or even a body worn camera. Further, the camera 200 may be a visible light camera, an infrared (IR) sensitive camera or a thermal (long-wavelength infrared (LWIR)) camera. Further, image acquisition devices employing LIDAR and radar functionalities may also be conceivable.

The camera 200 is continuously monitoring the scene 1 by capturing image frames forming a video stream of the scene 1. The scene 1 that is within the field of view of the camera is here exemplified as including the objects 104a-b and people 106a-c. The camera 200 may transmit the video stream over a radio link 112 connected to a communication network 114 having a transmission capacity, i.e., a bandwidth, to a client 116 or a server 118.

The camera 200 further comprises an image capturing module 202, an image processing pipeline 204, an encoder 206, a memory 208, and an input and output interface 210 configured as a communication interface between the camera 200 and the network 114 via the radio link 112.

The image capturing module 202 comprises various components such as a lens and an image sensor, where the lens is adapted to project an image onto the image sensor comprising multiple pixels.

The image processing pipeline 204 is configured to perform a range of various operations on image frames received from the image sensor. Such operations may include filtering, demosaicing, color correction, noise filtering for eliminating spatial and/or temporal noise, distortion correction for eliminating effects of e.g., barrel distortion, global and/or local tone mapping, e.g., enabling imaging of scenes containing a wide range of intensities, transformation, e.g., rotation, flat-field correction, e.g., for removal of the effects of vignetting, application of overlays, e.g., privacy masks, explanatory text, etc. However, it should be noted that some of these operations, e.g., transformation operations, such as correction of barrel distortion, rotation, etc., may be performed by one or more modules, components or circuits arranged outside the image processing pipeline 204, for example in one or more units between the image processing pipeline 204 and the encoder 206.

Following the image processing pipeline 204, the image frames are forwarded to the encoder 206, in which the image frames are encoded according to an encoding protocol and forwarded to a receiver, e.g., the client 116 and/or the server 118, over the network 114 using the input/output interface 210. It should be noted that the camera 200 illustrated in FIG. 1 also includes numerous other components, such as processors, memories, etc., which are common in conventional camera systems and whose purpose and operations are well known to those having ordinary skill in the art. Such components have been omitted from the illustration and description of FIG. 1 for clarity reasons.

The camera 200 may also comprise the data storage 208 for storing data relating to the capturing of the video stream. Thus, the data storage may store the captured video stream. The data storage may be a non-volatile memory, such as an SD card.

There are a number of conventional video encoding formats. Some common video encoding formats that work with the various embodiments of the present disclosure include: JPEG, Motion JPEG (MJPEG), High Efficiency Video Coding (HEVC), also known as H.265 and MPEG-H Part 2; Advanced Video Coding (AVC), also known as H.264 and MPEG-4 Part 10; Versatile Video Coding (VVC), also known as H.266, MPEG-I Part 3 and Future Video Coding (FVC); VP9, VP10 and AOMedia Video 1 (AV1), just to give some examples.

Generally, the encoder uses an encoding format with a variable bit rate. This means that data from the image frames that change from frame to frame are processed by the encoder and data that do not change, i.e., static areas in the image frames need not be encoded again. Thus, scenes with moving objects causes a higher bitrate than scenes without or with fewer moving objects.

The image processing pipeline 204 and the encoder 206 may be operative on a control unit 212. The camera 200 and the control unit 212 may be part of a camera system 10, where the control unit 212 may either be a separate stand-alone control unit or be part of the camera 200. It is conceivable that the control unit 212 is remotely located such as on a server and thus operates as a Cloud-based service.

However, the control unit 212 and the image capturing module 202 may be arranged as a single unit.

When monitoring the scene 1, the camera 200 continuously captures image frames using the image capturing module 202, processes the image frames in the image processing pipeline 204, encodes the processed data in encoder 206, and either stores the encoded image frames in the data storage 208 and/or directly transmits the encoded image frames over the communicant network 114 depending on the present available bandwidth in the communicant network 114.

Depending on the characteristics of the scene 1, the edge filtering in the image processing pipeline 204 produces varying amounts of data for the encoder 206 to encode. In case of a too high bitrate, storage problems or network problems may occur. For example, if the produced bitrate exceeds the bandwidth of the communication network 114, data transmission is hampered. Further, storage of the encoded image frames may become difficult due to deficit memory storage space in the data storage 208. Reducing the bitrate relieves the encoder 206 and consequently also allows for avoiding network bandwidth issues on the communication network 114.

Edge filtering is an advantageous type of privacy masking since it allows for protecting the privacy in the video stream while still being able to recognize and detect actions performed in the video stream. However, using edge filtering in the image processing pipeline 204 may cause an increased bitrate at the encoder 206. This is especially pronounced when movements or motions of objects are present in the video stream.

To alleviate this problem, the embodiments control the bitrate from a video stream captured with an image acquisition device 200 by adjusting parameters of an edge filter. The edge filter is used for privacy masking of at least one area of a captured scene 1 in the video stream.

Figure 2:
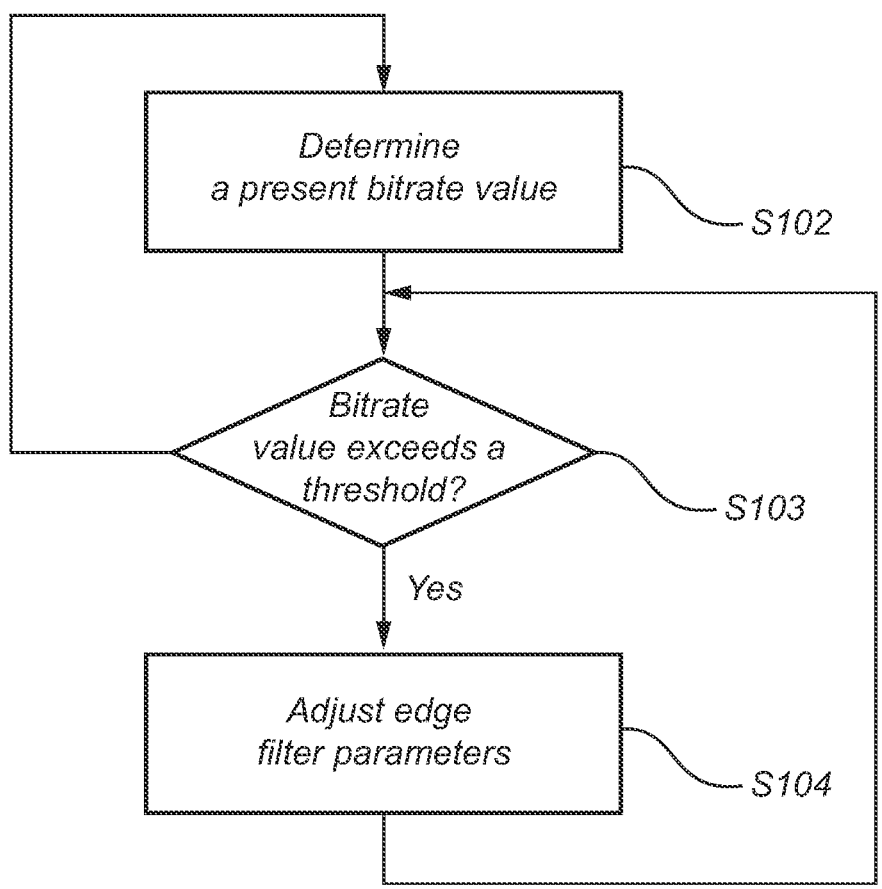
FIG. 2 is a flow-chart of method steps according to embodiments of the disclosure.

Turning now to FIG. 2, illustrating a flow-chart according to embodiments of the present disclosure.

In step S102 a present bitrate value of the video stream is determined. The present bitrate value is determined by the encoder 206 which receives the edge filtered video stream from the image processing pipeline 204.

The present bitrate value is compared to a threshold, and in response to detecting, S103, that the present bitrate value exceeds the threshold, at least one parameter of the edge filter is adjusted in step S104 to further reduce the amount of edges in the at least one area of the video stream to thereby control the bitrate.

Accordingly, in order control the bitrate of the data of the video stream that is to be transmitted over the communication network 114, the at least one edge filter parameter is controlled. For example, if fewer edges are produced in the resulting encoded image, the bitrate is reduced, i.e., fewer number of bits are produced in the encoder 206 and less data have to be transmitted over the communication network 114.

Comparison of the present bitrate value to the threshold may be performed by processing circuitry within the control unit 212. Further, adjustment of the edge filter parameters may be performed in the image processing pipeline 204 where the edge filtering occurs.

Figure 3A:
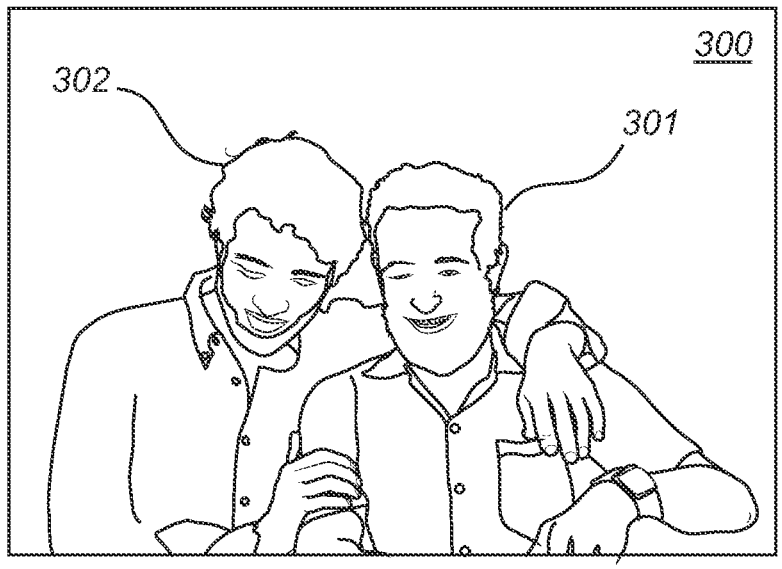
FIG. 3A conceptually illustrates an image frame on which an edge filter has been applied.
Figure 3B:
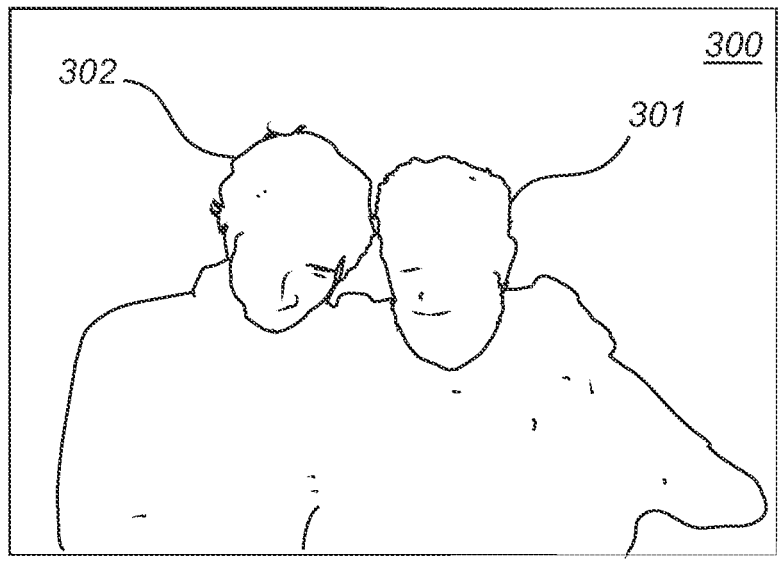
FIG. 3B conceptually illustrates the image frame shown in FIG. 3A but filtered with an edge filter having at least one adjusted parameter compared to the edge filter used in FIG. 3A.

FIGS. 3A and 3B each illustrate a conceptual example of an image frame 300 on which an edge filter with different levels of adjustment has been applied.

In FIG. 3A, the image frame 300 includes edges of two persons 301 and 302 that are visible and relatively clear, but with privacy still protected. In FIG. 3A, an edge filter with a first sensitivity, or a first adjustment setting, has been applied and would allow an operator to conclude the presence of two people, although their privacy is ensured.

In FIG. 3B, the same image frame 300 is shown, but here the edge filter is applied with lower sensitivity, or a different adjustment setting, than the edge filter applied to the image frame 300 in FIG. 3A, thereby resulting in that fewer edges are detected. Fewer edges lead to reduced bitrate in the encoder 206 since less data is changed between consecutive image frames.

Different types of edge filters are applicable to embodiments herein. One example edge filter relies on the Sobel filter operator which will be discussed briefly.

A Sobel filter may be based on two 3×3 kernels, one for horizontal ($G_x$) and one for vertical ($G_y$) changes. The Sobel kernels may be given by:

$$G_x = \begin{matrix} 1 & 0 & -1 \\ 2 & 0 & -2 \\ 1 & 0 & -1 \end{matrix}, G_y = \begin{matrix} 1 & 2 & 1 \\ 0 & 0 & 0 \\ -1 & -2 & -1 \end{matrix}$$

Both kernels are applied to the 2-dimensional image frame by convoluting the kernels to the 2-dimensional image frame which is represented by a matrix of pixel values, and for each pixel of the image frame, a gradient magnitude G can be computed:

$$G = \sqrt{G_x^2 + G_y^2}$$

The gradient magnitude G is compared to a detection threshold to determine whether an edge is present at a given pixel. By tuning the detection threshold, the amount of edges that are present in the filtered video stream is adjusted. For example, the detection threshold used for detecting edges for producing the image frame shown in FIG. 3A was lower than the corresponding detection threshold used for producing the image frame shown in FIG. 3B where fewer edges were detected. Thus, a higher detection threshold used in the edge filter results in fewer edges, FIG. 3B, and consequently to reduced bit rate.

As discussed herein, other edge filter operators are also applicable with other sized kernels, and other numeric elements included in the kernels and the above discussed Sobel operator serves as an example. Adjusting the elements of the kernels give a different weight to the pixel values used for computing the gradients $G_x$ and $G_y$ around the center pixel presently considered.

Adjusting a parameter of the edge filter may be to adjust the threshold that the gradient magnitude is compared to. However, it is also conceivable that adjusting a parameter of the edge filter is to adjust the values of the kernels of the edge filter.

The control unit 212 may estimate the amount of adjustment required for the edge filter based on the present bitrate value, or the adjustment may be fixed for each adjustment. If the adjustment of the edge filter is variable, the present need for adjustment may be estimated based on the difference between the present bitrate value and the threshold. With a variable bitrate, a bitrate control algorithm such as maximum bitrate (MBR) or average bitrate (ABR) is typically used to still have some control of the bitrate over time. Both MBR and ABR employs a variable bitrate, where MBR ensures that a present bitrate is below an upper limit, and thereby can estimate the difference between a threshold and a present bitrate. ABR is configured to ensure that an average bitrate over a given time window is below a certain threshold. Both these approaches enable a more refined variation of the amount of adjustment based on trends of the change in bitrate over time in relation to the predetermined MBR or ABR.

Preferably, subsequently to adjusting the edge filter parameters in step S104, it is again checked if the present bitrate exceeds or is equal to the threshold in step S103. In this way, the at least one parameter of the edge filter is adjusted until the present bitrate value is below the threshold. If a fixed adjustment is implemented, the fixed adjustment is applied until the present bitrate value is below the threshold. If a variable adjustment is implemented the present room for adjustment is estimated before each adjustment.

The present bitrate value may by a present bitrate as such or a present rate of a bitrate increase. Thus, present bitrate value being monitored may either be the present bitrate itself, or a time gradient of the bitrate based on a bitrate change from consecutive image frames.

The at least one parameter of the edge filter may be adjusted for predetermined areas of the captured scene. This may be implemented in different ways of which some will be described next. For example, in areas including moving objects, or in areas capturing persons far away, or in static privacy masking areas, the edge filter may be adjusted, whereas other areas may be left without adjusting the edge filter parameters.

Figure 4:
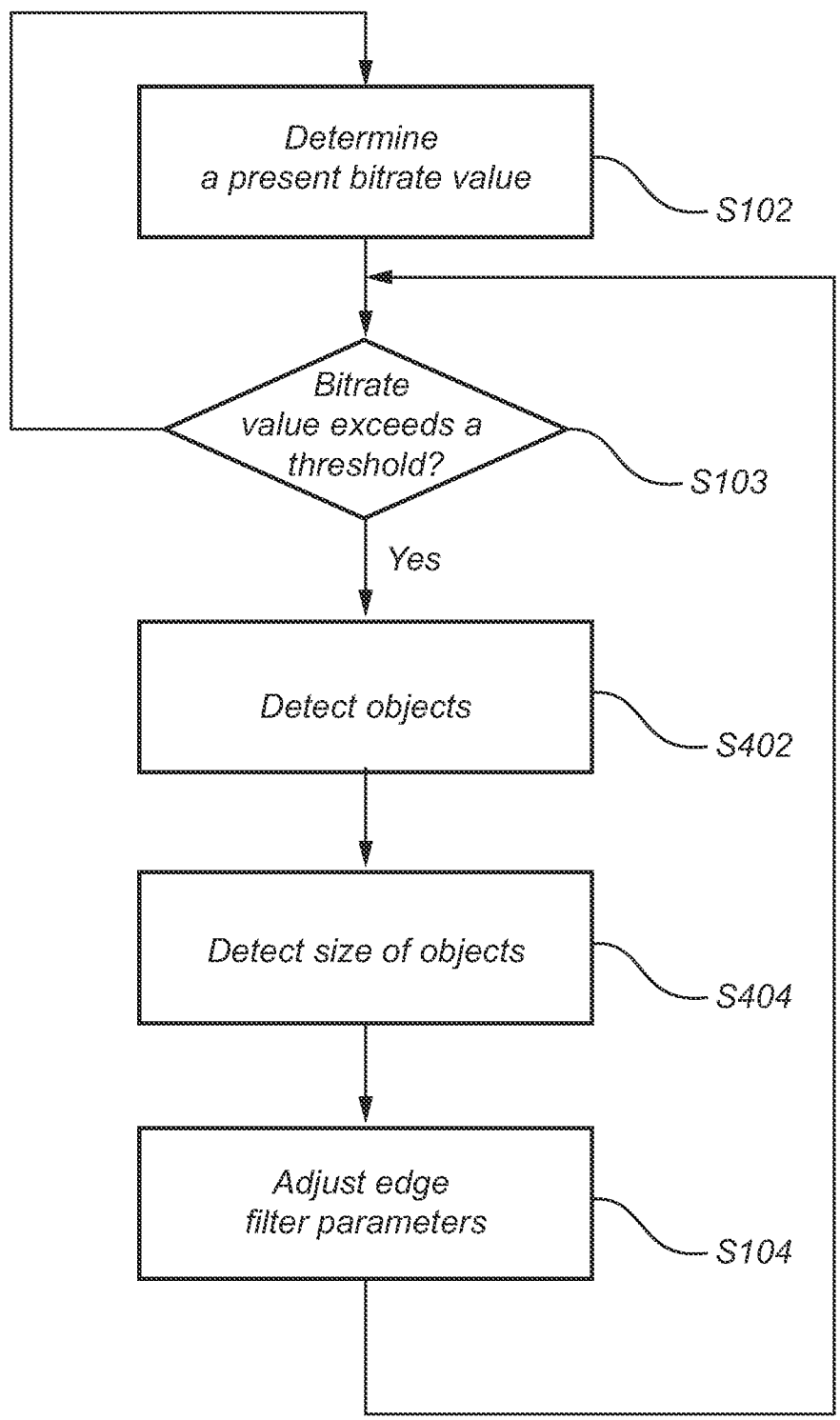
FIG. 4 is a flow-chart of method steps according to embodiments of the disclosure.
Figure 5A:
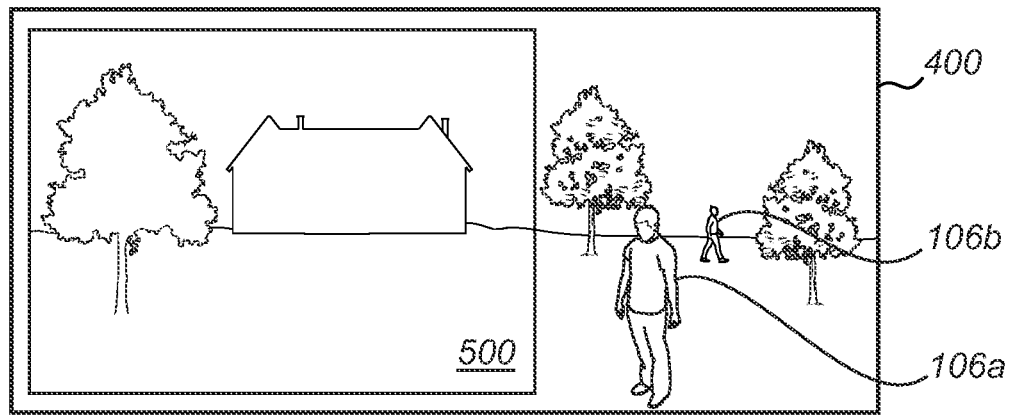
FIGS. 5A-B illustrate conceptual image frames.
Figure 5B:
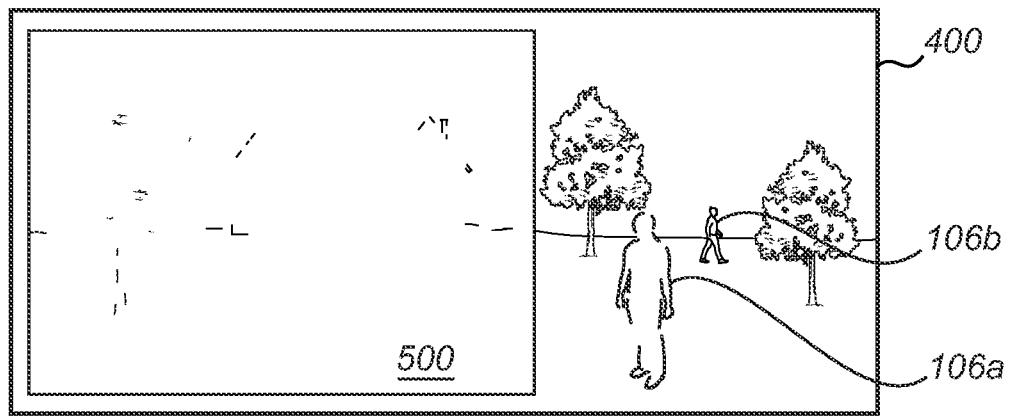

Turning now to the flow-chart in FIG. 4 and the conceptual captured image frame 400 in FIGS. 5A-B.

Objects 106a-b in areas of the captured scene are detected in step S402. Objects may be detected and classified using object detection algorithms such as object classifiers that may be operative in the image processing pipeline 204.

In step S404, detecting sizes of the objects 106a-b in the captured scene. If the objects are far away, their size are smaller than the size of objects closer to the camera 200. Thus, detecting the sizes of the objects 106a-b provides an efficient way to conclude at least indirectly if they are far away or close to the camera 200. Detecting a size may be performed by an estimation from the number of pixels associated with the detected object, or by other detection algorithms.

Further, the details of an object 106b far away from the camera may not be easily distinguishable even without the edge filter, whereby the edge filter over the corresponding areas of the object 106b may be adjusted to reduce the number of edges more than in areas of objects closer to the camera 200. In this way, the bitrate is reduced without losing too much information since the actions of the objects, i.e., persons, far away from the camera are not easily distinguishable regardless of the edge filtering. However, preferably, objects far from the camera 200, such as the person 106b may be sufficiently far from the camera 200 so that privacy masking is not needed to ensure privacy for the person 106b. The person 106a which is closer to the camera 200 is sufficiently close to require privacy masking of the corresponding region of the image frames of the video stream. Further, due to the proximity of the person 106a to the camera 200 more edges are detectable by the filter, whereby adjustment of the edge filter provides a larger reduction in bitrate value compared to corresponding adjustments for areas of the image frames corresponding to the person 106b further away. Thus, preferably, the edge filter over the corresponding areas of an object 106a close to the camera, i.e., with size equal to or exceeding a size threshold, may be adjusted to reduce the number of edges more than in areas of objects 106b further from the camera 200.

Thus, step S04 includes adjusting the at least one parameter of the edge filter differently in the areas of the captured scene depending on the size of the detected objects 106a-b in the respective area. FIG. 5A is the conceptual captured image frame 400 and FIG. 5B conceptually illustrates the image frame 400 but after edge filtering adjustment. In the depicted example, the object 106b which is further away from the camera is filtered less, i.e., so that some edges are still present, or not at all edge filtered, whereas the area of the object 106a being closer to the camera is filtered to reduce the amount of edges more than for the area of the object 106b being further away.

The detection of sizes may be followed by a thresholding step so that the at least one parameter of the edge filter is adjusted to reduce the amount of edges further for areas of the scene with objects having detected sizes exceeding or being equal to a size threshold, compared to areas with objects having detected sizes below the size threshold. The size threshold may be set depending on the use case for the camera 200.

As an alternative to detecting the size of objects, a depth model may be used for determining a distance from the detected object to the camera 200. The distance is compared to a distance threshold for determining whether to adjust the at least one parameter of the edge filter.

The step S402 of detecting an object may include to detect if the object is a person. If the detected object is a person, the edge filter may be applied in the area of the person and adjusted based on the size of the detected persons.

Further, detecting an object in step S402 may further include detecting a moving object. The at least one parameter of the edge filter is adjusted differently depending on a present size of the moving object in the captured scene.

In some embodiments, an area 500 may be predefined for static masking, conceptually illustrated in FIGS. 5A-B, in which masking may be applied regardless of detected objects or motions. Static masking areas 500 may relate to fixed areas where it is known beforehand that privacy masking will be required, for example areas where monitoring is not allowed, or areas where people are prohibited, and other means of surveillance is not possible. The adjustment of the edge filter in such static masking areas 500, may be globally adjusted. In other words, the edge filter is adjusted for the entire area 500 as a whole, as shown in FIG. 5B. However, a degree of adjustment of the edge filter parameters may depend on the distance from the camera of the area 500 corresponding to the static masking area.

Figure 6:
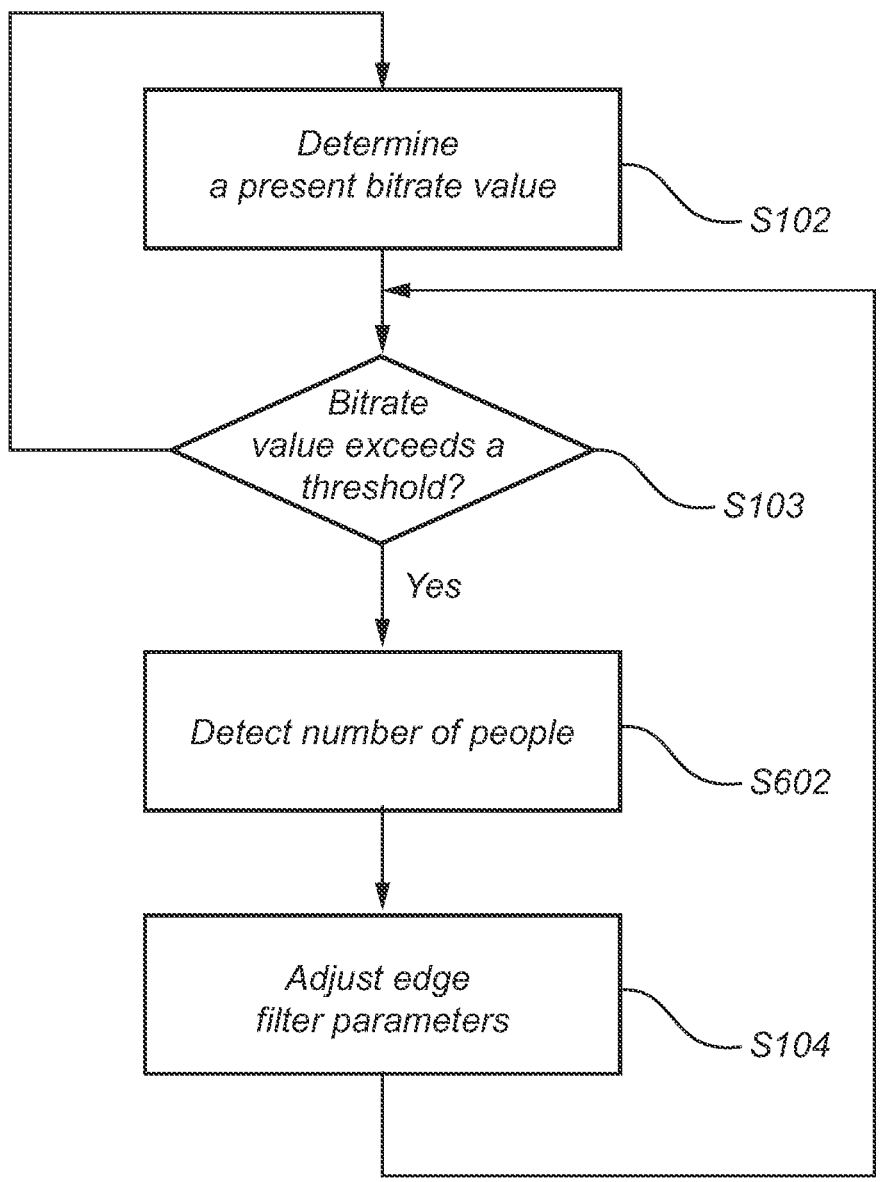
FIG. 6 is a flow-chart of method steps according to embodiments of the disclosure.

As described herein, a large amount of motion in the captured scene generates a high bitrate. Therefore, it is advantageous to adjust the filtering depending on the amount of people in the scene as people tend to move in the scene. Thus, in step S602 of the flow-chart in FIG. 6, detecting a number of people in the captured scene. The step S602 may be performed subsequent to step S402 in FIG. 4 or as part of step S402.

Figure 7A:
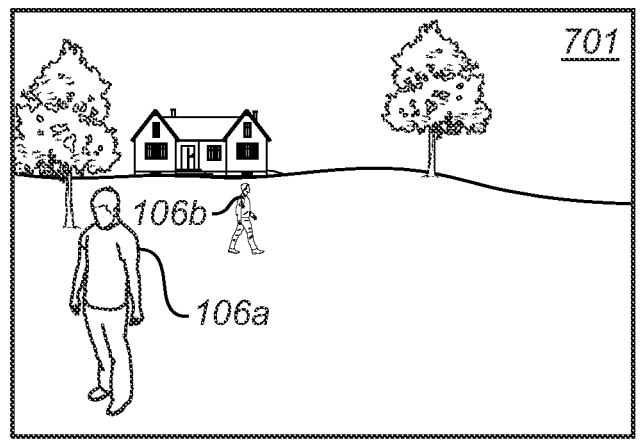
FIGS. 7A-B are conceptual captured image frames filtered with edge filters with differently adjusted parameters.
Figure 7B:
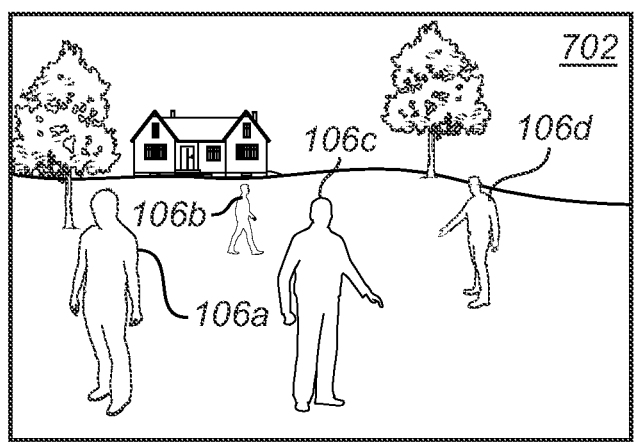

The image frames shown in FIGS. 7A-B illustrate subsequent image frames 701 and 702 where an edge filter is applied to the moving people 106a-b in the first image frame 701. However, as the number of people increases over a threshold, e.g., a people threshold of three people in this example, the at least one parameter of the edge filter is adjusted in step S104 to further reduce the number of edges of the detected people 106a-d as shown in FIG. 7B. Thus, despite the increase amount of motion in the video stream caused by the increased number of people, the bitrate can be maintained below the threshold.

Other types of masking may be applied as a complement to the edge filter. For example, image blurring may be applied on selected areas of the captured scene to further control the bitrate. Another example is to apply a solid color mask on selected of the captured scene to further control the bitrate. Applying a solid mask requires less computational power and memory that applying an edge filter and may be advantageously used for privacy masking areas where detectability of actions is not desirable or not possible, such as far from the camera 200.

Figure 8:
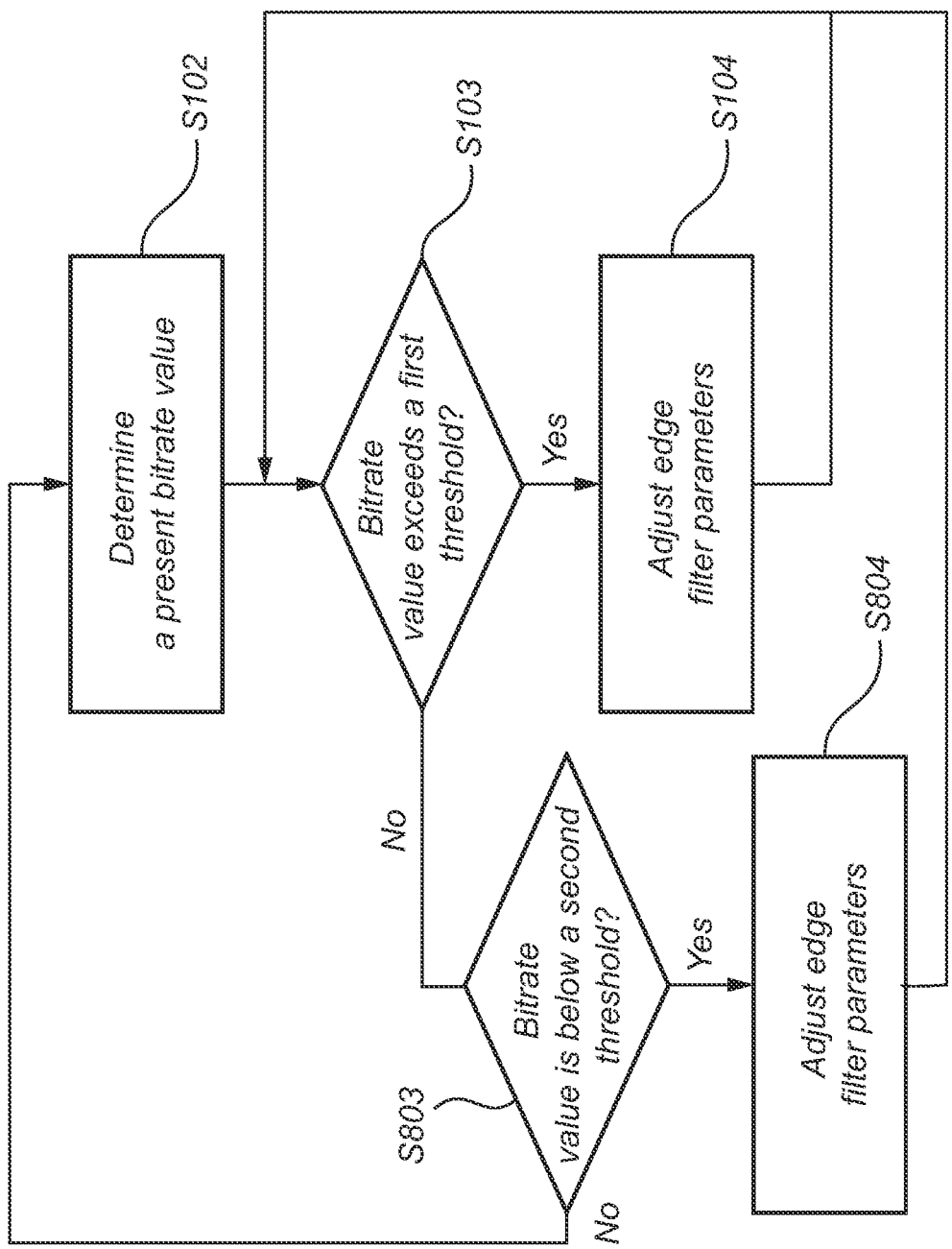
FIG. 8 is a flow-chart of method steps according to embodiments of the disclosure.

In case the bitrate falls to a relatively low value, then there is room for increasing the bitrate which allows for adjusting the parameters of the edge filter in such a way to increase the amount of edges. This will enhance the video stream details for an operator at a client 116 or server 118 to better resolve any actions in the video stream. For this, the method may further comprise, as indicated in the flow-chart of FIG. 8, in response to detecting, in step S803, that the present bitrate value is below a second threshold that is lower than the first threshold, adjusting, in step S804, at least one parameter of the edge filter to increase the amount of edges in the at least one area of the video stream to thereby control the bitrate. Once the adjustment is performed in step S804, the method again checks if the bitrate exceeds the first threshold, which is the threshold discussed for example in relation to FIG. 2, step S103. The second threshold is selected so that some level of detail is still present in the filtered video stream so that actions and events in the video stream is still resolvable. In other words, the second threshold is selected so that actions, events, or motions are resolvable or distinguishable in the filtered video stream while still ensuring privacy for objects and persons in the video stream. The second threshold may be set for a present use case.

There is further provided a control unit 212 for controlling a bitrate of a video stream captured with an image acquisition device and filtered using an edge filter for privacy masking of at least one area of a captured scene in the video stream, the control unit is configured to perform the steps of the methods described herein.

A computer program is provided comprising instructions which, when the program is executed by a computer, cause the computer to carry out the method of any one of the methods described herein.

The control unit includes a microprocessor, microcontrol unit, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontrol unit or programmable digital signal processor mentioned above, the processor may further include computer executable code that controls operation of the programmable device.

The control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for controlling a bitrate of a video stream captured with an image acquisition device and filtered using an edge filter for privacy masking of at least one area of a captured scene in the video stream, the method comprising:
   determining a present bitrate value of the video stream;
   in response to detecting that the present bitrate value exceeds or is equal to a threshold,
      detecting objects in areas of the captured scene;
      detecting sizes of the objects in the captured scene; and
      adjusting at least one parameter of the edge filter to further reduce the amount of edges in the at least one area of the video stream to thereby control the bitrate,
      wherein adjusting further comprises adjusting the at least one parameter of the edge filter differently in the areas of the captured scene depending on the size of the detected objects in the respective area.

2. The method according to claim 1, wherein the present bitrate value is a present bitrate or a present rate of a bitrate increase.

3. The method according to claim 1, comprising:
   adjusting the at least one parameter of the edge filter until the present bitrate value is below the threshold.

4. The method according to claim 1, wherein the at least one parameter of the edge filter is adjusted for predetermined areas of the captured scene in the video stream.

5. The method according to claim 1, wherein the at least one parameter of the edge filter is adjusted to reduce the amount of edges further for areas of the captured scene with objects having detected sizes exceeding or being equal to a size threshold, compared to in areas with objects having detected sizes below the size threshold.

6. The method according to claim 1, wherein the step of adjusting comprises:
   adjusting the parameter of the edge filter globally for static masking areas of the captured scene.

7. The method according to claim 1, comprising applying image blurring on selected areas of the captured scene to further control the bitrate.

8. The method according to claim 1, comprising applying solid color masking on selected areas of the captured scene to further control the bitrate.

9. A control unit for controlling a bitrate of a video stream captured with an image acquisition device and filtered using an edge filter for privacy masking of at least one area of a captured scene in the video stream, the control unit is configured to perform the method according to claim 1.

10. The control unit of claim 9, further comprising image acquisition device configured to capture a video stream.

11. A non-transitory computer-readable storage medium having stored thereon a computer program comprising instructions which, when the program is executed by a computer, cause the computer to carry out the method according to claim 1.

12. A method for controlling a bitrate of a video stream captured with an image acquisition device and filtered using an edge filter for privacy masking of at least one area of a captured scene in the video stream, the method comprising:
   determining a present bitrate value of the video stream;
   detecting a number of people in the captured scene;
   in response to detecting that the number of people exceed a first threshold, adjusting at least one parameter of the edge filter to further reduce the amount of edges of the detected people in the video stream to thereby control the bitrate; and
   in response to detecting that the present bitrate value exceeds or is equal to a second threshold, adjusting at least one parameter of the edge filter to further reduce the amount of edges in the at least one area of the video stream to thereby control the bitrate.

13. A method for controlling a bitrate of a video stream captured with an image acquisition device and filtered using an edge filter for privacy masking of at least one area of a captured scene in the video stream, the method comprising:
   determining a present bitrate value of the video stream;
   detecting a moving object; and
   in response to detecting that the present bitrate value exceeds or is equal to a threshold, adjusting at least one parameter of the edge filter depending on a present size of the moving object in the captured scene to further reduce the amount of edges in the at least one area of the video stream to thereby control the bitrate.

14. A method for controlling a bitrate of a video stream captured with an image acquisition device and filtered using an edge filter for privacy masking of at least one area of a captured scene in the video stream, the method comprising:
   determining a present bitrate value of the video stream;
   in response to detecting that the present bitrate value exceeds or is equal to a first threshold, adjusting at least one parameter of the edge filter to further reduce the amount of edges in the at least one area of the video stream to thereby control the bitrate; and
   in response to detecting that the present bitrate value is below a second threshold lower than the first threshold, adjusting at least one parameter of the edge filter to increase the amount of edges in the at least one area of the video stream to thereby control the bitrate.

15. A control unit for controlling a bitrate of a video stream captured with an image acquisition device and filtered using an edge filter for privacy masking of at least one area of a captured scene in the video stream, the control unit is configured to perform the method according to claim 12.

16. A control unit for controlling a bitrate of a video stream captured with an image acquisition device and filtered using an edge filter for privacy masking of at least one area of a captured scene in the video stream, the control unit is configured to perform the method according to claim 13.

17. A control unit for controlling a bitrate of a video stream captured with an image acquisition device and filtered using an edge filter for privacy masking of at least one area of a captured scene in the video stream, the control unit is configured to perform the method according to claim 14.

18. A non-transitory computer-readable storage medium having stored thereon a computer program comprising instructions which, when the program is executed by a computer, cause the computer to carry out the method according to claim 12.

19. A non-transitory computer-readable storage medium having stored thereon a computer program comprising instructions which, when the program is executed by a computer, cause the computer to carry out the method according to claim 13.

20. A non-transitory computer-readable storage medium having stored thereon a computer program comprising instructions which, when the program is executed by a computer, cause the computer to carry out the method according to claim 14.

* * * * *